United States Patent [19]

Gould

[11] Patent Number: 5,053,751

[45] Date of Patent: Oct. 1, 1991

[54] WATER ALARM TO SIGNAL FLOODING IN BASEMENTS

[76] Inventor: Reed D. Gould, 13813 Fawnview La., Cold Spring, Minn. 56320

[21] Appl. No.: 531,902

[22] Filed: Jun. 1, 1990

[51] Int. Cl.$^5$ ............................................. G08B 21/00
[52] U.S. Cl. .................................. 340/623; 340/616; 73/308; 73/305
[58] Field of Search ............... 340/616, 604, 605, 623, 340/624; 73/305, 306, 307, 308

[56] References Cited

U.S. PATENT DOCUMENTS

| | | | |
|---|---|---|---|
| 4,216,468 | 8/1980 | Kaufmann | 340/616 X |
| 4,398,186 | 8/1983 | Statz | 340/616 |
| 4,922,234 | 5/1990 | Murphy | 340/623 |

Primary Examiner—Joseph A. Orsino
Assistant Examiner—Jeffery A. Hofsass
Attorney, Agent, or Firm—Merchant, Gould, Smith, Edell, Welter & Schmidt

[57] ABSTRACT

This invention concerns a water alarm adapted to be mounted in a basement water drain. It comprises a buoyant body which is in a first position when water is absent from the drain and which is moved to a second position by the presence of sufficient water filling the drain pipe. The buoyant body carries a switch which is in an open position when the body is in its first position and which is in a closed position when the body is in its second position. A suitable alarm is activated when the switch is in its closed position. The buoyant body is held in position adjacent the upper end of the drain under the metal drain cover by a magnetic holder member.

2 Claims, 1 Drawing Sheet

U.S. Patent
Oct. 1, 1991
5,053,751
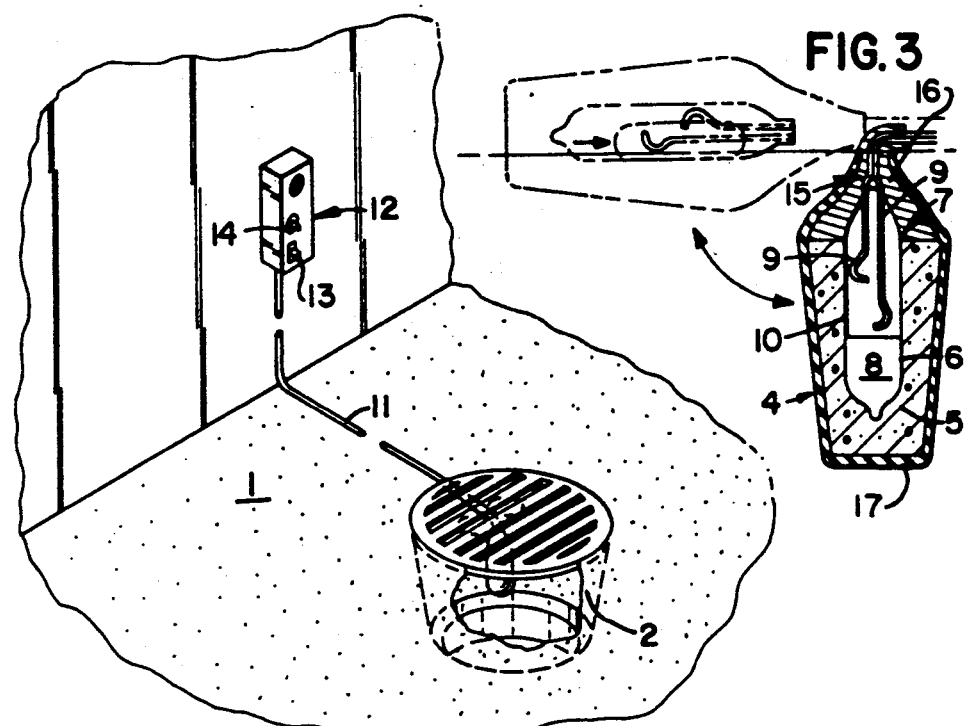
FIG. 1
FIG. 3
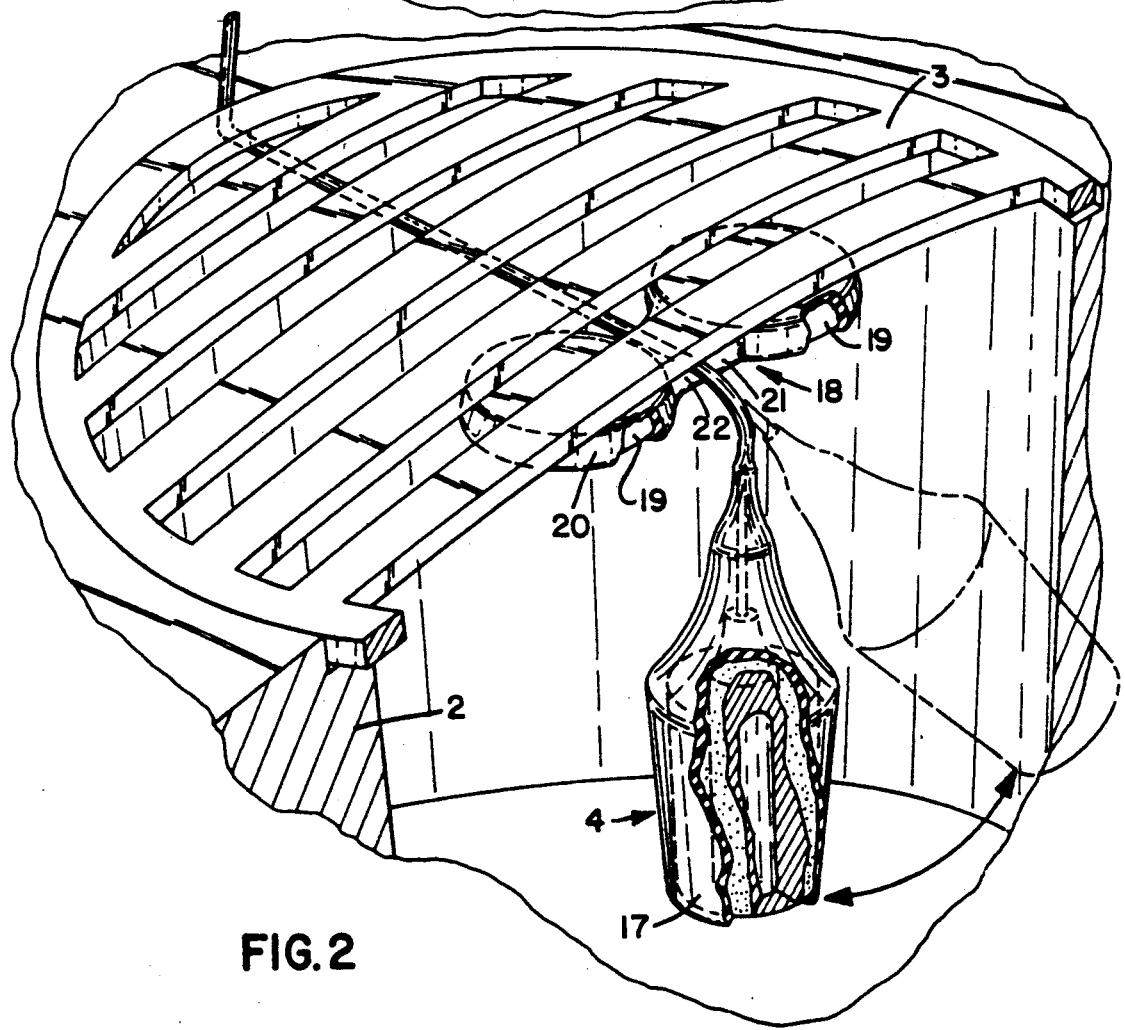
FIG. 2

WATER ALARM TO SIGNAL FLOODING IN BASEMENTS

TECHNICAL FIELD

This invention relates to a water alarm for use in the basement of a residential or commercial building to signal flooding in the basement.

PRIOR ART

Prior to my invention various alarm systems had been known in which an audible or a visible alarm has been activated by various sensors, such as smoke alarms or the like. Included within such prior art alarms has been one particularly adapted to hang onto a bath tub and including an 11" sensor arm coming into contact with the water.

SUMMARY OF THE INVENTION

The flooding of basements because of clogged or over-flowing basement drains has been a problem. Such flooding normally occurs because the occupant is unaware of the drain becoming clogged or over-flowing. A flooded basement can cause considerable damage.

It is an object of my invention to provide a water alarm which alerts a resident immediately upon the water in a basement drain or sewer pipe reaching a dangerous level.

It is an object of my invention to solve the problem of flooded basements by providing a water alarm which fits any floor drain, is easy and simple to install, and is inexpensive.

BRIEF DESCRIPTION OF THE DRAWINGS

FIG. 1 is a three-dimensional view, with certain parts broken away, showing the water alarm of my invention installed in a basement drain.

FIG. 2 is a three-dimensional view, partly in section and partly broken away of the structure of FIG. 1.

FIG. 3 is a detailed sectional view of the buoyant body of the water alarm, showing its two positions; the normal vertical position shown in full lines and its substantially horizontal switch actuating position shown in dotted lines.

DETAILED DESCRIPTION

The water alarm of my invention is adapted to be mounted in the drain pipe or sewer connection located in the basement of a residential or commercial building. Referring to FIG. 1, the basement area is indicated generally by the numeral 1. Located in the floor of the basement 1 is a drain pipe or a sewer connection indicated by the numeral 2. Drain pipe 2 is covered by a metal, apertured cover 3.

Referring particularly to FIG. 3, my water alarm comprises a buoyant body indicated generally by the numeral 4. Buoyant body 4 consists of a cork member 5 having a cavity or hollowed-out recess 6. Cavity 6 receives an encapsulated mercury switch indicated generally by the numeral 7. Switch 7 includes mercury 8 and contacts 9 which are enclosed in a glass or other suitable container 10. Contacts 9 are connected by wires 11 to space terminals, not shown, of a self-contained battery operated, wall-mounted audible alarm 12. Alarm 12 has an on/off switch 13, and a test button 14.

At the end of switch 7 which projects out of cork member 5, contacts 9 are connected to wires 11 at the position indicated by the numeral 15. The end of switch 7 and position 15 are encapsulated in a suitable plastic material indicated by the numeral 16 which provides a tapered upper end to buoyant body 4. Cork body 5 and the upper tapered end of body 4, together with that portion of wires 11 shown in FIG. 2 are covered with a suitable plastic sealant material indicated by the numeral 17.

Body 4 is mounted in a depending, normally vertical position, as shown in FIG. 1 and in full lines in FIGS. 2 and 3, by a magnetic holder indicated generally by the numeral 18. Holder 18 consists of a pair of cylindrical magnets 19 which are coated with and connected together by plastic material 20. The plastic material 20 which connects magnets 19 forms a bridge 21. Magnets 19 are attracted to metal cover 3. Bridge 21 is not as thick as magnets 19 so that a narrow cavity or space 22 is formed between the bottom of cover 3 and bridge 21.

Body 4 is held in a first position, which is then generally vertical, depending position shown in full lines in FIG. 2 by magnet holder 18. Body 4 is positioned adjacent the top of drain 2 just under cover 3 as shown. Body 4 will remain in its first position so long as water is not filling the drain pipe. Water not filling the drain pipe is referred to as being absent from the drain. If the drain pipe fills with water to the extent that it would cause flooding into the basement 1, buoyant body 4 is moved from its first position to its second position as shown in dotted lines in FIG. 3. At this position body 4 is generally horizontal. FIG. 2 in dotted lines shows body member 4 in the process of moving from its vertical position toward a generally horizontal position. As body 4 approaches a horizontal position, mercury 8 will make electrical contact between separate contacts 9 which will complete the circuit to cause the battery operated alarm 12 to sound a large audible alarm signal. Alarm 12 will continue to sound either until it is turned off by switch 13 or the water level abates sufficiently to cause body 4 to return to a generally vertical position.

Test button 14 is a switch which completes the electrical circuit in alarm 12 and it can be depressed to test whether the alarm is properly functioning.

Although I have specifically shown a small self-contained audible alarm situated in basement 1, wires 11 could be connected to a remote alarm system for use in commercial buildings or in residences where the occupants are away from the premises for a considerable period of time. The alarm could be monitored in the same way as security systems which are now well known. As can be seen from the foregoing description and drawings, my invention provides a water alarm which will fit any floor drain. It is very easy and simple to install and the simple installation as shown in the drawings is very inexpensive to manufacture.

Although I have shown a preferred form of my water alarm and method of installation, modifications to my invention will be apparent to those skilled in the art; and I intend my invention be limited only by the following claims.

What is claimed is:

1. A water alarm adapted to be mounted in a basement water drain having a metal perforated drain plate comprising:
    a buoyant body adapted to be mounted in said water drain beneath said metal cover;
    a mercury switch carried by said body;
    said body being in a first position when water is absent from said drain and moved to a second position by the presence of sufficient water filling the drain, the switch carried by said body being in an open position when the body is in its first position and being in a closed position when the body is in its second position;

an alarm actuated by said switch when it is in its closed position;

means mounting said body adjacent the upper end of said drain beneath the metal cover thereof in a generally vertically depending position;

said mounting means comprising a pair of spaced magnetic members connected together by a bridge which forms a space between the bridge and the metal cover of the drain;

electrical wiring between the switch and the alarm passing through said space;

whereby said magnetic members in contact with the lower side of the drain cover securely mount said body in position adjacent the upper end of the water drain.

2. The water drain of claim 1 in which said body is cork, said mercury switch is mounted in the cork body, and said body and switch are sealed with a plastic coating.

* * * * *